2,977,332

RAPIDLY HARDENABLE MIXTURES OF EPOXY RESINS AND POLYAMIDE RESINS

Heinz Zumstein, Basel, Switzerland, assignor to Ciba Limited, Basel, Switzerland, a Swiss firm No Drawing. Filed Sept. 24, 1957, Ser. No. 685,788

Claims priority, application Switzerland Oct. 2, 1956

14 Claims. (Cl. 260—18)

It is known to use as hardening agents for epoxy resins inorganic acids and salts, Friedel-Crafts catalysts, organic acid anhydrides, and aliphatic or aromatic amines and salts thereof. Furthermore, polyamide resins have recently been proposed as especially suitable hardening agents for epoxy resins. These polyamide resins are condensation products of dimerized or trimerized unsaturated fatty acids, advantageously vegetable fatty acids, such as for example fatty acids of linseed oil, soya bean oil or dehydrated castor oil with aliphatic polyamines, particularly ethylene diamine and diethylene triamine. These polyamide resins which probably contain end amino groups are described for example in Ind. Eng. Chem., vol. 49 (1957), page 1091 et seq. The special importance of these polyamide resins is that, like the known aliphatic polyamines, they are capable of hardening epoxy resins at room temperature, the hardened products being distinguished by interesting properties. The use of polyamide resins is of advantage, for example, in the production of coatings and varnish or lacquer films on all kinds of supports, and also for adhesively uniting metals.

The present invention is based on the observation that the use of Mannich bases as additions to mixtures of epoxy resins and polyamide resins causes a decided acceleration in the hardening of epoxy resins by means of polyamide resins.

Accordingly, the present invention provides mixtures of epoxy resins with polyamide resins obtained from dimerized or trimerized unsaturated fatty acids and aliphatic polyamines, which mixtures contain a Mannich base which contains at least one tertiary amino group and at least one phenolic hydroxyl group.

Among epoxy resins there are included, for example, polyesters containing epoxide groups, such as are obtained by the reaction of a dicarboxylic acid especially an aromatic dicarboxylic acid, such as phthalic acid or terephthalic acid, with epichlorhydrin in the presence of an alkali. There may also be used polyethers containing epoxide groups, such as are obtained by reacting an epoxide compound, for example, epichlorhydrin, with a polyhydric hydroxyl-compound, advantageously a polyhydric phenol such as resorcinol or hydroquinone, in the presence of an alkali. Especially advantageous are the epoxy resins obtainable by the reaction of epichlorhydrin with 4:4'-dioxydiphenyl-dimethylmethane in an alkaline medium.

As Mannich bases there are to be understood compounds of the general type

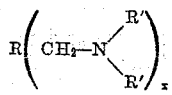

in which X is a whole number of at least one, advantageously the whole number 3 or 4, R represents the radical of a mono-nuclear or poly-nuclear mono- or polyphenol, and R' represents an alkyl, hydroxyalkyl, aryl or hydroxyaryl radical, and, if desired, the two R' radicals may together with the nitrogen atom form a ring system, such as that of piperidine or morpholine.

These bases are made by the Mannich reaction described by R. Adams in "Organic Reactions," vol. 1, pages 304 et seq. As examples of Mannich bases for use in the present invention there may be mentioned 2-(dimethylaminomethyl) - phenol, 2:6-di-(dimethylaminomethyl)-phenol, 2:4:6-tri-(dimethylaminomethyl)-phenol, 2:4:6-tri - (dihydroxydiethylaminomethyl) - phenol, 2:4:6-tri-(morpholinomethyl) - phenol, 2-(dimethylaminomethyl)-6-methylphenol, 2-(dimethylaminomethyl)-4-octylphenol, 2-(dimethylaminomethyl) - 3:5-dimethylphenol, 2:4:6-tri-(piperidinomethyl) - phenol, 2:4:6-tri-(dimethylaminomethyl) - 3-methylphenol, 2-methoxy-6-(dimethylaminomethyl)-phenol, 1-(dimethylaminomethyl) - naphthol-2-and 4:4'-dihydroxy - 3:5:3':5'-tetra-(dimethylaminomethyl) - diphenyl-dimethylmethane ("Tetra-(dimethylaminomethyl)-Diane").

Especially suitable are Mannich bases which contain 2 to 4 dimethylaminomethyl side chains and 1 or 2 phenolic hydroxyl groups.

The use of the polyamides hereinbefore referred to as hardening agents alone for epoxy resins in many cases does not lead to satisfactory results. In particular the slow hardening of such mixtures at room temperature for many coating purposes has been found disadvantageous. By the addition of compounds which are known as agents for hardening epoxy resins at room temperature, for example, triethylene tetramine, pentamethyl-diethylene triamine, dimethylaminopropylamine and N:N'-tetramethyl-1:3-diaminopropanol-(2), to a mixture of epoxy resins and polyamide resins causes little or no acceleration in hardening.

On othe other hand, for example, it is possible with a lacquer made with an epoxy resin and a polyamide resin, to which a small proportion of a Mannich base has been added in accordance with this invention, to produce on a very wide variety of supports coatings which become dust-dry after 30 minutes at room temperature and have a hardness of 150 Persoz seconds after 4 hours. If, however, the Mannich base is not added the coatings take more than one hour to become dust-dry and after 4 hours have a hardness of only about 60 Persoz seconds, that is to say, they are still soft at the end of that period.

The optimum proportion of the Mannich base varies depending on the constitution of the base and is within the range of about 1 to 20 parts by weight and advantageously 4 to 12 parts by weight, calculated on the weight of the epoxy resin.

The mixtures of epoxy resins, polyamide resins and Mannich bases or a mixture of different Mannich bases, apart from their value for producing coatings, are also of advantage for the production of spreadable compositions, casting resins, adhesives and laminating resins, for the production of foils, plates or the like. The compositions of this invention may also contain pigments or filling materials of various kinds, softening agents, plasticisers or solvents. They may also contain amino-compounds from among the aliphatic and aromatic polyamines known as hardening agents, for example, triethylene tetramine, dimethylaminopropylamine, N:N'-tetramethyl-1:3-diaminopropanol-(2) or the like. In this way a further acceleration in hardening can be attained, such as is not produced by the addition of such an amine alone, that is to say, in the absence of one or more Mannich bases.

The following examples illustrate the invention, the parts and percentages being by weight.

EXAMPLE 1

100 parts of an epoxy resin, which had been obtained in known manner by condensing 4:4'-dihydroxydiphenyldimethylmethane with epichlorhydrin in an alkaline medium and had an epoxide equivalent weight of 330 grams were triturated with 270 parts of a pigment mixture from lithopone, pearl white and $TiO_2$ and 15 parts of dioctyl phthalate to form a thick paste. The paste was then mixed with 50 parts of a polyamide resin which was obtained by condensing a dimerized unsaturated vegetable fatty acid and diethylene triamine and which is commercially available under the name "Versamid 115," and with one of the amino-compounds mentioned in the table given below. Each of the compositions marked $a$ to $f$ in the table was then spread with a spatula to form a coating 3–4 mm. thick on an aluminum plate and the coating was allowed to harden at 22° C. and a relative humidity of 70–75%.

*Effect of various amino-compounds in accelerating the hardening of epoxy resin-polyamide resin compositions*

| No. | Quantity of epoxy resin in grams | Quantity of polyamide resins in grams | Amino-compound | grams | Period to become tack-free in hours [1] | Period to become abradable in hours [2] |
|---|---|---|---|---|---|---|
| a | 100 | 50 | Tri-(dimethyl-amino-methyl)-phenol (Mannich Base). | 6.42 | 6 | 9–10 |
| b | 100 | 50 | "Tetra(dimethyl-aminomethyl)-Diane"(Mannich-Base). | 8.30 | 7 | 20 |
| c | 100 | 50 | Triethylene tetramine. | 0.65 | 10 | 24 |
| d | 100 | 50 | N:N'-tetra-methyl-1:3-diaminopro-panol-(2). | 5.30 | about 10 | 24 |
| e | 100 | 50 | N-dimethyl-amino-propyl-amine. | 0.85 | 10 | 24 |
| f | 100 | 50 | Pentamethyldi-ethylene tri-amine. | 4.20 | 9 | 24 |
| g | 100 | 50 | no addition | | 10 | 24 |

[1] The tack-free character of the coating was determined by lightly drawing the finger over the coating.
[2] The abradability of the coating was determined by abrading it in the dry state with fine abrasive paper. The coating is abradable when a fine dry powder free from agglomerate results, which can be removed from the abrasive paper by lightly tapping it.

EXAMPLE 2

100 parts of the epoxy resin mentioned in Example 1 were mixed with 14 parts of dioctyl phthalate and 50 parts of the polyamide resin used in Example 1 and 6.42 parts of 2:4:6-tri-(dimethylamino-methyl)-phenol (Mannich base) were added. The resulting composition was cast in a tin foil cup 4 cm. in diameter and 1.5 cm. deep. The casting was tack-free after hardening for 5 hours at 22° C. and a relative humidity of 70–75% and was hard after 9 hours. When the Mannich base was omitted the casting was still not tack-free after 10 hours and was hard after 20 hours.

EXAMPLE 3

100 parts of an epoxy resin, obtained from diphenylolpropane and epichlorhydrin in known manner and having an epoxide equivalent weight of 300 grams, were mixed with a mixture of solvents consisting of 2 parts of ethylene glycol monomethyl ether, 1 part of butanol and 2 parts of toluene to produce a solution having a solids content of 60%. To the solution were added 50 parts of polyamide resin, also diluted with the above described solvent mixture to a concentration of 60% and 6.42 parts of 2:4:6 - tri - (dimethylaminomethyl)-phenol (Mannich base), and the resulting composition was applied by means of a film casting triangle in the form of a coating 20±2 microns thick on a sheet of plate glass. The resulting lacquer coating was dust-dry after 30 minutes at about 30° C. and a relative humidity of 70–75% and a pendulum hardness of 150 seconds according to Persoz after 4 hours. When the addition of the Mannich base was omitted, the coating became dust-dry in 60–70 minutes and had a hardness of only 70 seconds (according to Persoz) after 4 hours.

EXAMPLE 4

100 parts of the epoxy resin mentioned in Example 3 were mixed with the solvent mixture used in Example 3 to give a solution having a solids content of 60%. To the solution were added 50 parts of the polyamide resin used in Example 1, also diluted with the above solvent mixture to a concentration of 60%, and 10.0 parts of a Mannich base obtained in known manner from phenol, piperidine and formaldehyde, and the resulting composition was applied by means of a film casting triangle in the form of a layer 20±2 microns thick to a sheet of plate glass. The lacquer coating so produced has a pendulum hardness of 352 seconds (according to Persoz) after a hardening period of 30 minutes at 100° C.

EXAMPLE 5

To the mixture of epoxy resin and polyamide resin described in Example 4, each resin being used in the form of a solution of 60% strength, were added 10 parts of a Mannich base obtained in known manner from para-octyl-phenol, dimethylamine and formaldehyde, and the mixture was applied by means of a film casting triangle in the form of a layer 20±2 microns thick to a sheet of plate glass. The resulting lacquer layer had a pendulum hardness of 212 seconds (according to Persoz) after hardening for 60 minutes at 50° C. When the Mannich base was omitted the hardness attained under the same conditions was only 90 seconds.

EXAMPLE 6

To the mixture of epoxy resin and polyamide resin described in Example 4, both resins being used in the form of a solution of 60% strength, were added 10.0 parts of 2:4:6 - tri - diethylaminomethyl)-phenol (Mannich base), and the mixture was applied by means of a film casting triangle in the form of a layer 20±2 microns thick to a sheet of plate glass. The resulting lacquer coating had a pendulum hardness of 295 seconds (according to Persoz) after a hardening period of only 15 minutes at 100° C.

EXAMPLE 7

The procedure was the same as described in Example 5, except that, instead of the Mannich base used in that example, 10 parts of a mixture of equal parts of the said Mannich base and triethylene tetramine were used. A layer of the composition 20±2 microns thick applied to a sheet of plate glass had a pendulum hardness of 160 seconds (according to Persoz) after a hardening period of 12 hours at 22° C. and a relative humidity of 70–75%.

EXAMPLE 8

The procedure was the same as described in Example 2, except that, instead of the Mannich base used in that example, there were used 5 parts of a mixture of equal parts of the said Mannich base and tetra-(dimethylaminomethyl)-diphenyl-dimethylmethane. The lacquer coating 20±2 microns thick produced with the resulting composition had a Pendel hardness of 225 seconds (according to Persoz) after a hardening period of 24 hours at 22° C. and a relative humidity of 70–75%. On the other hand, when 6 parts of the said mixture of Mannich bases were used, the pendulum hardness was 185 seconds after 12 hours and it increased to 300 seconds after 24 hours. When the Mannich bases were omitted, hardnesses of 65–155 seconds (according to Persoz), respectively, were attained under the same conditions.

EXAMPLE 9

60 parts of a polyester containing epoxide groups, obtained from phthalic acid and epichlorhydrin in alkaline medium and known in commerce as "Metallon K," (of the firm Henkel & Co.) were dissolved in 40 parts of the solvent mixture used in Example 3 and mixed with 100 parts of a solution of 60% strength of the polyamide resin used in Example 1. To the resulting mixture 6 parts of tri-(dimethylaminomethyl)-phenol (Mannich base) were added, and the mixture was applied by means of a film casting triangle in the form of a coating 20±2 microns thick to a sheet of plate glass. The resulting lacquer coating had a Pendel hardness of 120 seconds (according to Persoz) after hardening for 30 minutes at 100° C. When the Mannich base was omitted, a poorly spreadable turbid lacquer coating was obtained which has a pendulum hardness of 24 hours (according to Persoz) after hardening under the same conditions.

EXAMPLE 10

100 parts of an epoxy resin obtained in known manner from diphenylol-propane and epichlorhydrin and having an epoxide equivalent weight of 200, were triturated with 10 parts of dibutyl phthalate and 7 parts of "Aerosil" (trade name for silicon dioxide of low bulk density) to form a paste A. A paste B was also prepared by mixing together 50 parts of the polyamide resin used in Example 1, 4 parts of "Aerosil" and 10 parts of tri-(dimethylaminomethyl)-phenol. The two pastes were mixed together, two aluminum plates were adhesively united by means of the mixture, and the mixture was hardened at 20–25° C. Even after 8 hours the adhesive bound had a shear strength of 0.8 kg. per square millimeter, whereas when the Mannich base was omitted or the same quantity of an amino compound, for example, dimethylaminopropylamine was used instead of it, the same hardening time gave bonds having shear strengths of 0.1–0.2 kilogram per square centimeter.

What is claimed is:

1. A hardenable resin composition comprising (a) an epoxy resin containing 1,2-terminal epoxy groups, (b) a polyamide resin obtained by reacting an aliphatic polyamine with a polymeric unsaturated higher fatty acid, and (c) a Mannich base derived from a phenol and having at least one tertiary amino group and at least one phenolic hydroxyl group.

2. A hardenable resin composition comprising (a) an epoxide resin containing 1,2-terminal epoxy groups, (b) a polyamide resin obtained by reacting an aliphatic polyamine with a polymeric unsaturated higher fatty acid selected from the class consisting of dimerized unsaturated higher fatty acids and unsaturated trimerized higher fatty acids, and (c) a Mannich base derived from a phenol and having at least one tertiary amino group and at least one phenolic hydroxyl group.

3. A hardenable resin composition comprising (a) an epoxide resin containing 1,2-terminal epoxy groups, (b) a polyamide resin obtained by reacting an aliphatic polyamine with a polymeric unsaturated higher fatty acid selected from the class consisting of dimerized unsaturated higher fatty acids and unsaturated trimerized higher fatty acids, and (c) a Mannich base derived from a phenol and having at least one tertiary amino group selected from the class consisting of dialkylamino, dihydroxyalkylamino, diarylamino, dihydroxyarylamino, piperidino and morpholino groups, and at least one phenolic hydroxyl group.

4. A hardenable resin composition comprising (a) an epoxide resin containing 1,2-terminal epoxy groups, (b) a polyamide resin obtained by reacting an aliphatic polyamine with a polymeric unsaturated higher fatty acid selected from the class consisting of dimerized unsaturated higher fatty acids and unsaturated trimerized higher fatty acids, and (c) a Mannich base derived from a phenol and having at least one dimethylaminomethyl group, and at least one phenolic hydroxyl group.

5. A composition as claimed in claim 4, which contains as component (c) 2:4:6-tri-(dimethyl-aminomethyl)-phenol.

6. A composition as claimed in claim 4, which contains as component (c) 4:4'-dihydroxy-3:5:3':5'-tetra-(dimethylaminomethyl)-phenyl-dimethyl methane.

7. A hardenable resin composition comprising (a) an epoxide resin containing 1,2-terminal epoxy groups, (b) a polyamide resin obtained by reacting an aliphatic polyamide with a polymeric unsaturated higher fatty acid selected from the class consisting of dimerized unsaturated higher fatty acids and trimerized unsaturated higher fatty acids, and (c) a Mannich base which is derived from a phenol selected from the class consisting of phenol, naphthol, dihydroxy diphenyl and diphenylol-propane, and which phenol contains as substituent at least one tertiary amino-methyl group.

8. A hardenable resin composition comprising (a) an epoxide resin containing 1,2-terminal epoxy groups, (b) a polyamide resin obtained by reacting an aliphatic polyamine with a polymeric unsaturated higher fatty acid selected from the class consisting of dimerized unsaturated higher fatty acids and trimerized unsaturated higher fatty acids, and (c) a Mannich base which is derived from a phenol selected from the class consisting of phenol, naphthol, dihydroxy diphenyl and diphenylol-propane, and which phenol contains as substituent at least one tertiary amino-methyl group, selected from the class consisting of dialkylamino-methyl, dihydroxyalkylamino-methyl, diarylamino-methyl, dihydroxyarylamino-methyl, piperidino-methyl and morpholino-methyl groups.

9. A hardenable resin composition comprising (a) an epoxide resin containing 1,2-terminal epoxy groups, (b) a polyamide resin obtained by reacting an aliphatic polyamine with a polymeric higher fatty acid selected from the class consisting of dimerized unsaturated higher fatty acids and trimerized unsaturated higher fatty acids, and (c) a mixture of at least two Mannich bases each of which is derived from a phenol and has at least one tertiary amino group and at least one phenolic hydroxyl group.

10. A process of curing epoxide resins which comprises reacting (a) an epoxide resin containing 1,2-terminal epoxy groups, (b) a polyamide resin obtained by reacting an aliphatic polyamine with a polymeric unsaturated higher fatty acid, and (c) a Mannich base derived from a phenol and having at least one tertiary amino group, and at least one phenolic hydroxyl group.

11. A process of curing epoxide resins which comprises reacting (a) an epoxide resin containing 1,2-terminal epoxy groups, (b) a polyamide resin obtained by reacting an aliphatic polyamine with a polymeric unsaturated higher fatty acid selected from the class consisting of dimerized unsaturated higher fatty acids and unsaturated trimerized higher fatty acids, and (c) a Mannich base derived from a phenol and having at least one tertiary amino group and at least one phenolic hydroxyl group.

12. A process of curing epoxide resins which comprises reacting (a) an epoxide resin containing 1,2-terminal epoxy groups, (b) a polyamide resin obtained by reacting an aliphatic polyamine with a polymeric unsaturated higher fatty acid selected from the class consisting of dimerized unsaturated higher fatty acids and unsaturated trimerized higher fatty acids and (c) a Mannich base derived from a phenol and having at least one tertiary amino group selected from the class consisting of dialkylamino, dihydroxyalkylamino, diarylamino, dihydroxyarylamino, piperidino and morpholino groups and at least one phenolic hydroxyl group.

13. A process of curing epoxide resins which comprises reacting (a) an epoxide resin containing terminal epoxy groups, (b) a polyamide resin obtained by reacting an aliphatic polyamine with a polymeric unsaturated higher fatty acid selected from the class consisting of dimerized unsaturated higher fatty acids and trimerized unsaturated higher fatty acids and (c) a Mannich base which is derived from a phenol selected from the class consisting of phenol, naphthol, dihydroxydiphenyl and diphenylolpropane, and which phenol contains as substituent at least one tertiary amino-methyl group selected from the class consisting of dialkylamino-methyl, dihydroxyalkylamino-methyl, diarylamino-methyl, dihydroxyarylamino-methyl, piperidino-methyl and morpholino-methyl groups.

14. A process of curing epoxide resins which comprises reacting (a) an epoxide resin containing 1,2-terminal epoxy groups, (b) a polyamide resin obtained by reacting an aliphatic polyamine with a polymeric unsaturated higher fatty acid selected from the class consisting of dimerized unsaturated higher fatty acids and trimerized unsaturated higher fatty acids, and (c) a mixture of at least two Mannich bases each of which is derived from a phenol and has at least one tertiary amino group and at least one phenolic hydroxyl group.

References Cited in the file of this patent

UNITED STATES PATENTS

| | | |
|---|---|---|
| 2,705,223 | Renfrew et al. | Mar. 29, 1955 |
| 2,798,833 | Lapsensohn et al. | July 9, 1957 |

FOREIGN PATENTS

| | | |
|---|---|---|
| 516,107 | Canada | Aug. 30, 1955 |

OTHER REFERENCES

Northwestern Club, Paint, Oil & Chemical Review, Nov. 5, 1953, pages 72–80.

Cranker et al.: Ind. Eng. Chem. 48 (No. 1), pp. 98–103 (January 1956).

Schildknecht: "Polymer Processes," Chapt. X, Interscience Pub. Inc., N.Y., 1956.

Schildknecht: "Polymer Processes," page 441, Interscience Pub. Inc., New York, 1956.

Lee et al., "Epoxy Resins," page 95 and page 174, McGraw-Hill Book Co., Inc., N.Y., 1957